United States Patent [19]

Gramling

[11] 3,725,570

[45] Apr. 3, 1973

[54] TELEVISION SIGNAL CONVERTER

[76] Inventor: William D. Gramling, 6149 Tompkins Drive, McLean, Va. 22101

[22] Filed: Sept. 30, 1970

[21] Appl. No.: 76,679

Related U.S. Application Data

[63] Continuation-in-part of Ser. No. 780,683, Dec. 3, 1968, abandoned.

[52] U.S. Cl. .........178/5.2 R, 178/5.4 CD, 178/5.4 C, 178/5.4 M

[51] Int. Cl. ............................................H04h 9/50

[58] Field of Search ....178/5.4, 5.2 R, 5.4 CD, 5.4 C, 178/5.4 M, 5.4 MA

[56] References Cited

UNITED STATES PATENTS

| | | | |
|---|---|---|---|
| 3,534,151 | 10/1970 | Bruch | 178/5.2 R |
| 3,506,775 | 4/1970 | McMann, Jr. | 178/5.2 R |
| 3,485,942 | 12/1969 | Melchior | 178/5.2 R |

*Primary Examiner*—Robert L. Griffin
*Assistant Examiner*—Barry L. Leibowitz
*Attorney*—Mason, Mason and Albright

[57] ABSTRACT

Means for converting sequential color television signals into simultaneous color television signals of the same line and field rate. Also included are means for removing chroma fringing of televised moving objects and means for removing noise from the video or detected error signal to prevent interference of operational thresholds.

7 Claims, 7 Drawing Figures

TELEVISION SIGNAL CONVERTER

CROSS REFERENCE TO RELATED APPLICATIONS

This is a continuation-in-part of application Ser. No. 780,683, filed Dec. 3, 1968 now abandoned.

BACKGROUND OF THE INVENTION

1. Field of the Invention

The present invention pertains to the field of television, particularly the conversion of one mode of operation into another.

2. Description of the Prior Art

The conversion of sequential television signals which comprise the three primary colors, usually red, blue, and green in sequence, into a simultaneous signal has not been satisfactorily performed in prior art. The conversion of a 60 field rate sequential signal into a 60 field rate simultaneous signal has undesirable side effects such as chroma fringing of active televised subjects and flicker. A 180 field sequential signal conversion to a 60 field simultaneous signal avoided these problems but presented more such as the difficulty of converting the time-base of the signals.

One method that was attempted was to feed the 180 fields-per-second signal into three separate picture tubes which were then individually scanned by three monochrome television cameras at a 60 field rate to develop three simultaneous color signals.

The problems of this system included phosphor deficiencies, nonlinear responses of picture and camera tubes, brightness limitations, misregistration and spurious patterns among other problems.

Another method is to record the 180 field rate signal onto a moving magnetic tape with three separate recording heads and reproducing the signals with three separate playback heads that are moved in the direction of travel of the tape but at a slower rate. This reproduces the 180 field signal in 1/60 second, giving three separate simultaneous color signals.

This method creates additional problems involving the deficiencies in video tape recording such as the complex circuits needed, the rapid wear of the recording tape and heads, the effects of dust and humidity, the complex and expensive transport mechanism plus other problems that made this invention as well as the other impractical.

There are other methods which utilize essentially the same procedures and inherit the problems involved.

Therefore the need and value of a practical sequential-to-simultaneous video converter is great. Existing monochrome cameras will produce excellent color with just the addition of a rotated synchronized filter wheel. The need of "timing" a studio will be eliminated. Monochrome video tape recorders will produce unexcelled color with no modifications. Obsolete black-and-white mobile units will deliver color to the television station with only the addition of color filters and a synchronizing amplifier.

SUMMARY OF THE INVENTION

The present invention enables the industries to enjoy the well-known advantages of field-sequential television such as simplicity, low cost and superior sensitivity without sacrificing quality or convenience. The embodiments described herein permit the use of 60-field sequential equipment and avoid the pitfalls of chroma-fringing and flicker. The invention includes circuitry to detect and eliminate the chroma-fringing which, until now, was considered undetectable. Also included is noise elimination circuitry which strips the noise from the original video signal or the chroma-fringing error signal, whichever would be appropriate for individual needs.

An object of this invention is to provide simple, stable, and inexpensive sequential-to-simultaneous conversion apparatus.

Another object of this invention is to provide a sequential-to-simultaneous converter that will eliminate flicker and color fringing while operating on a standard 60 fields per second, thus avoiding the necessity of also converting field rates.

Another object of this invention is to provide a means of eliminating wide-band noise from video, error and other signals.

This conversion apparatus provides a means of supplying three simultaneous television signals representing the three primary colors that were devised from a sequential system. The apparatus provides one input to a cascade of one-field delay lines, a means of switching the outputs of these delay lines to the respective primary color inputs of the encoder, and television signal comparators that interpret and correct color fringing of televised moving objects. Also provided is a means for removing noise from the error signal or the video signal. The previously-mentioned one-field delay lines can take different forms. They are (1) a magentic recording device utilizing a motor-driven disc or drum and associated record and playback heads, (2) magneto-strictive delay lines of the torsional type, present state of the art allowing 16.67 millisecond delay with a 500 kilohertz to 1.2 megahertz band-pass, (3) computer memories such as the magnetic core type, a one-field delay with a 10 step gray scale utilizing 167,000 bits with synchronized read-in and read-out and (4) ultrasonic delay lines, which are well established in the industries and are the most practical for the present invention.

BRIEF DESCRIPTION OF THE DRAWINGS

For a fuller description of this invention, reference is now made to the attached drawings. They are.

Figure 1:
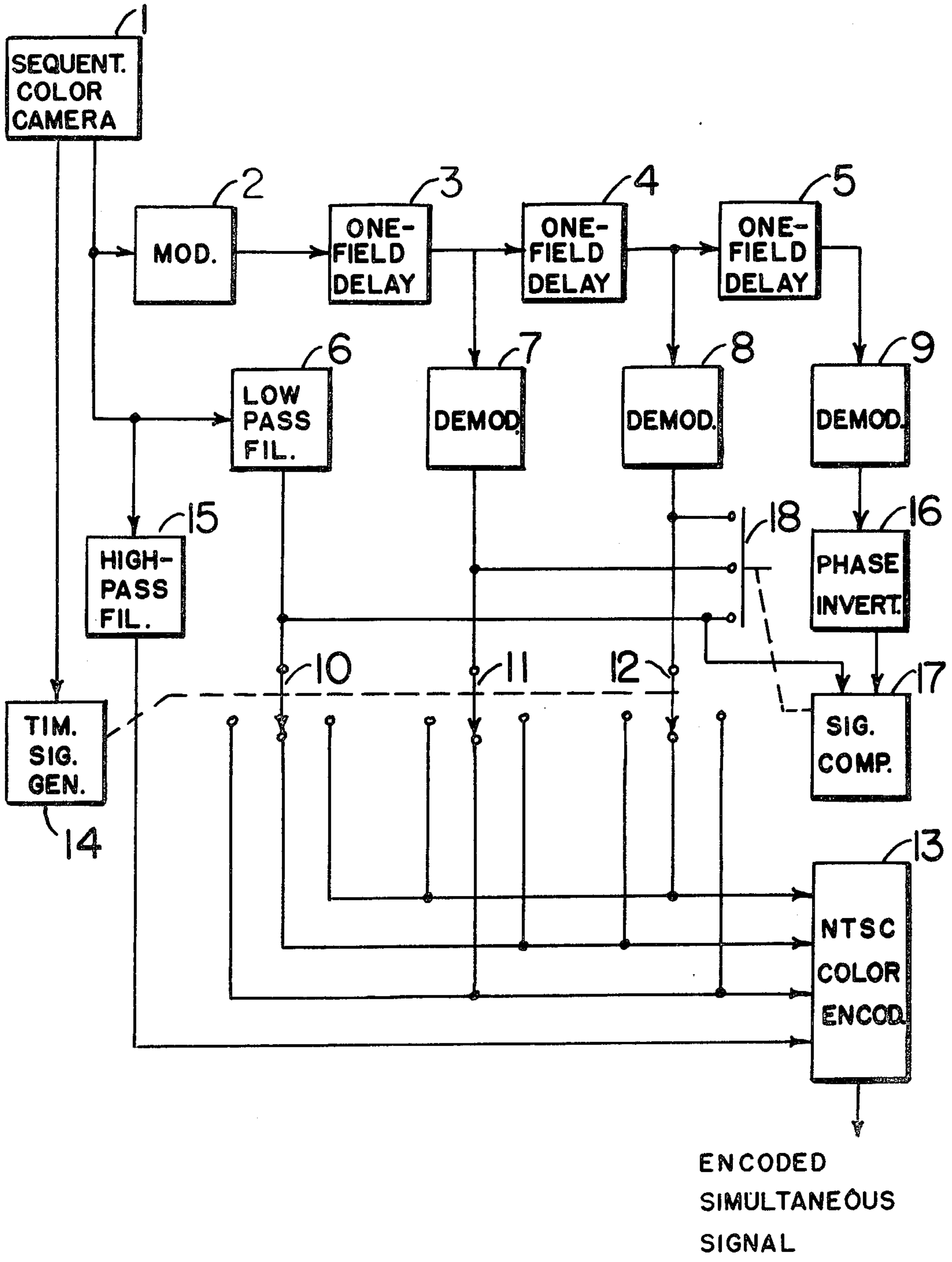
FIG. 1 Schematically illustrates the signal conversion invention equipped with a fringe-chroma killer.

Description and explanation of the signal conversion invention with fringe-chroma killer in FIG. 1

DESCRIPTION OF THE PREFERRED EMBODIMENTS

Referring to FIG. 1, the field sequential color camera 1 generates a television signal representing one of the primary colors, green for example. The green signal is fed through the 2 megahertz low pass filter 6 through the electronic channel switch 10 to the NTSC color encoder 13. The green signal is also frequency modulated in the modulator 2 and fed into the first one-field delay 3. At the end of the green field, the camera 1 generates the red signal. This signal follows the path of green before it but the electronic channel switch 10 has moved to the red input of the encoder 13. As green emerges from the one-field delay 3 it is directed into the next one-field delay 4. It also takes a second path but this will be explained later. Next, the camera 1 generates the blue signal. This signal takes the path of green and red before it, again with the exception that the electronic channel switch 10 has moved to the blue input of the encoder 13. At this instant the green signal has moved to the last one-field delay 5, the red is in the center one-field delay 4 and the last of the blue has just entered the first one-field delay 3. With the three signals in these delays we are ready to understand the normal operation of this invention.

The timing signal generator actuates the three electronic channel switches 10, 11, 12. These are moved to direct the alternating color signals from the low-pass filter 6, and the two demodulators 7, 8 into the proper inputs of the NTSC color encoder 13.

The next event is the generation of the green signal by the camera 1. This green signal is fed through the low pass filter 6 through the channel switch 10 into the green input of the encoder 13. At this same instant the blue signal is emerging from the one-field delay 3 through the demodulator 7 to the channel switch 11. The switch 11 directs it into the blue input of the encoder 13. Also at this same instant red is emerging from the one-field delay 3 through the demodulator 7 to the channel switch 11. The switch 11 directs it into the blue input of the encoder 13. Also at this same instant red is emerging from the one-field delay 4 through the demodulator 8 and channel switch 12 into the red input of the encoder 13. It should be noted that the same portion of each of the three signals arrives at the encoder 13 at the same instant, thus insuring perfect color registration.

As is illustrated the output of the camera 1 is also directed through a two megahertz high pass filter 15. The remaining high frequencies minus the luminous portion of the camera output is mixed with the luminous output of the encoder matrix to produce constant up-to-date high frequencies that form the detail of the image.

The following is an explanation of the fringe-chroma killer. The purpose of this part of the present invention is to effectively eliminate the color fringing that occurs when an active subject is televised by the sequential method. A solution to this is to detect such displacement in the position of the active subject and eliminate the chroma only on the effected edges. This will render such displacement invisible. Again referring to FIG. 1, the displacement error is detected by directing the output of the one-field delay 5 through a demodulator 9 and a phase inverter 16 into a signal comparator 17. It happens that the signal that is stored in the one-field delay 5 is the same color signal that is emerging from the camera 1 but is three fields earlier. The displacement encountered by comparing these two signals will encompass all displacement of the other color signals of this particular edge. In the case of televised unmoving objects the camera signal and the negative signal from the one-field delay 5 are compared and cancel. In the case of displacement an error signal is derived from the comparison. This error activates the fringe-chroma killer switch 18. The switch 18 couples all color inputs to the encoder 13 together, thus removing the chroma for the duration of the displacement error. Therefore the color is removed from all displaced edges. Included in the signal comparator is a noise-clipping circuit that will provide an automatic threshold, error signal enhancer and noise eliminator in the error-pulse circuit. This is needed to avoid video noise triggering the chroma-fringing circuit at a point where there is no chroma-fringing.

Figure 6:
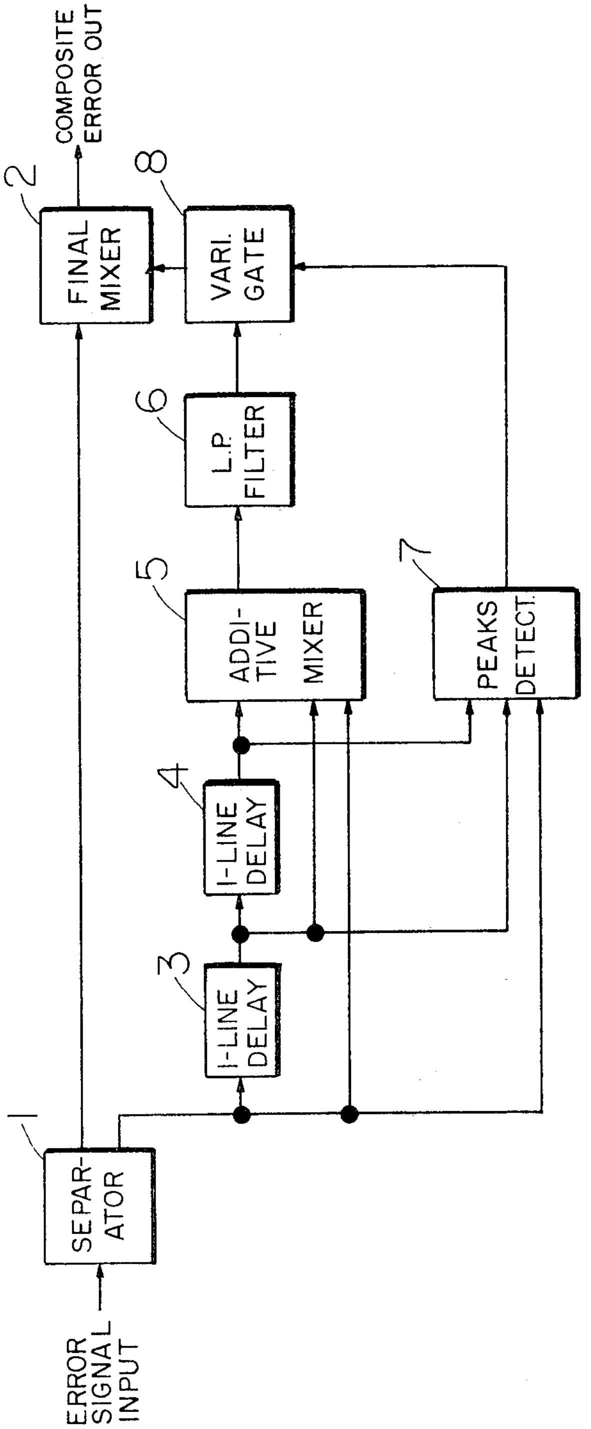
FIG. 6 schematically illustrates the error or video signal enhancer and noise clipper.

Referring to FIG. 6, the error signal from the comparator enters the separator 1. This divides the signal, sending the higher peaks thru to the final mixer 2. The lower error pulses, formed from the displacement of low-contrast picture elements and mixed with noise, are routed to the first of the two one-line delays 3, 4 and also, bypassing the delays, directly to the additive mixer 5. The mixer combines the three signals; direct, one-line delayed and two-line delayed. These represent three consecutive lines of error signals which are essentially alike except for the random noise.

The random noise partially adds and partially cancels, increasing by a factor of 1.7. The desirable pulses coincide and increase by a factor of 3.0.

The output of the additive mixer 5 is directed into a 500 KHz LP filter 6 to eliminate the higher frequencies of the signal.

The signals from the separator 1 and the two one-line delays 3, 4 are also fed into the peaks detector 7. The detector constantly compares and passes only the highest of the three signals, forming a fourth signal comprised of the highest portions of the three lines.

The output of the LP filter 6 is fed into the variable gate 8. The fourth signal, clamped slightly higher than the noise, acts as the bias for the variable gate 8. The noise of the added signals, increased by 1.7, is below the potential of the bias signal and is cut off. The desirable signal pulses, enhanced by mixing to a factor of 3.0, is greater than the bias signal and the gate 8 conducts for this period.

The variable bias is used rather than one that is fixed because since it is comprised of the highest levels of the noise and signal, it is able to rise higher than the peaks of noise and yet remain lower than the true error pulses.

The final mixer 2 combines the high-pulsed signal from the separator with the enhanced amplified pulses from the variable gate to form the composite error signal ready for use.

Another method to avoid the circuitry interference by noise is to eliminate the noise from the video signal itself by utilizing this circuit. Since the enhancing of the lower frequency picture elements will lift the higher frequency noise contained on these elements above the clipping potential of the bias signal, this particular noise will escape the noise-elimination capabilities of this circuit. Therefore, the enhanced video signal from the additive mixer 5 and the bias signal from the peaks detector 7 is placed through two identical filters to separate the said signals into several different frequency bands. Each band would then have its own variable gate and after the noise is removed, the resultant signals, consisting of the several bandwidths of information, are remixed in the final mixer 2 to form a composite, noise-free video signal.

The mixing of three adjacent lines of video by the additive mixer 5 degrades the vertical resolution because any differences of level among the lines is averaged. Thus the three lines are compared for differences in level and if a predetermined difference is detected among the three lines, the input to the noise-clipping circuit is bypassed to the output for the duration of the level difference. The noise is retained on this area of difference but the area is so small that the noise is not discernible.

The 500 kilohertz L.P. filter 6 is deleted when the circuit is used to process video. The noise clipping circuit, in this case, is placed on the input to the Converter.

This circuit can also be used to eliminate the noise from any repetitious signals as long as the length of the delays match the repetition rate. Where practical, non-repetitious signals can be repeated at a specified rate with a storage and switcher circuit to utilize the advantages of the noise-clipping circuit.

Figure 2:
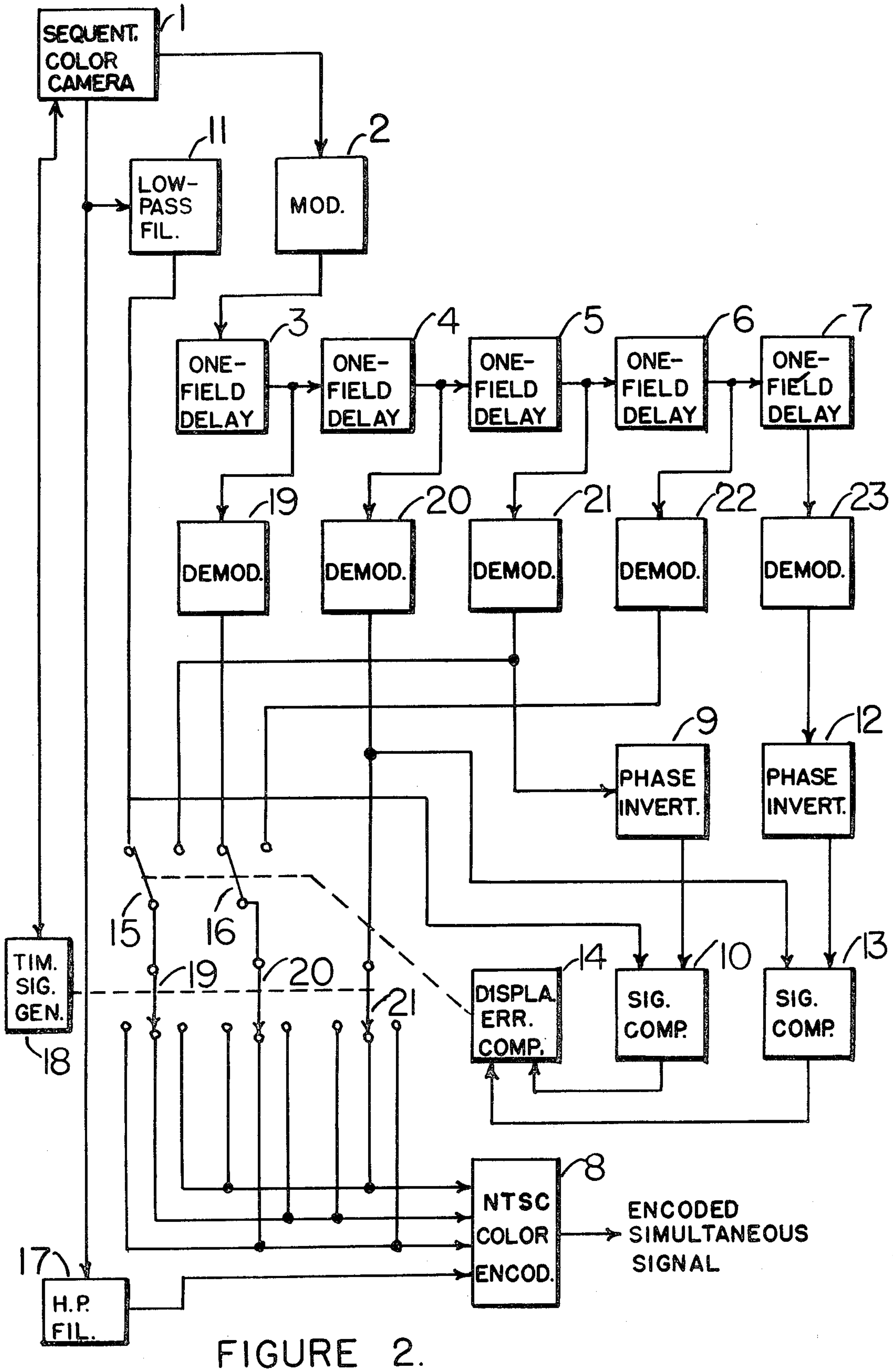
FIG. 2 Schematically illustrates the signal conversion invention equipped with a displacement delay network.

Description and explanation of the signal converting invention with displacement delay apparatus in FIG. 2

This variation of the present invention is similar to the description of FIG. 1 except this includes a displacement delay in place of the fringe-chroma killer.

The displacement delay is an apparatus that detects a displacement in the position of an active televised subject by comparing time-separated fields of the same color. The signals from the other two colors are then delayed the appropriate amount to match the displaced edges of the three colors. Referring to FIG. 2, the signal is developed in the color camera 1. As in the explanation of FIG. 1, the green, red, and blue signals are developed in sequence and directed through the FM modulator 2 into the cascade of one-field delays 3, 4, 5, 6, 7. In this case five delays are used. Thus a total of five sequential fields are stored in the delays. Delays 3 and 4 in conjunction with the live camera signal supply the simultaneous feeds to the NTSC color encoder 8. Delay 5 output is the same color signal as that of the color camera 1, but is time separated. The output of delay 5 is inverted in the phase inverter 9 and compared in the signal comparator 10 with the camera 1 output that has passed through a 2 megahertz low-pass filter 11. If the televised object is moving left to right or from top to bottom as viewed by the television camera 1, the displacement error is of a negative polarity. If the object is moving right to left or bottom to top, the error is of a positive polarity. In a like manner the output of the one-field delay 7 is inverted in the phase inverter 12 and compared in the signal comparator 13 with the output of the delay 4. The signals contained in delays 4 and 7 are also the same color but time-separated. The polarity of the output of the signal comparator 13 is of no consequence. It is pointed out that the delays 3 and 6 hold the same color signal but again are time separated. No displacement error need be derived from delays 3 and 6.

The errors from comparators 10 and 13 are directed into the displacement error comparator 14. This unit will determine the position of the electronic delay switches 15 and 16. With no correction from the displacement error comparator, the delay switches 15 and 16 feed the output of the camera 1 and the one-field delay 3 to the encoder 8. If a positive error from signal comparator 10 is received the delay switches 15 and 16 are activated to feed the outputs of one-field delays 5 and 6 to the encoder in place of the camera 1 and delay 3. This condition remains until an error signal is received from signal comparator 13. Then the delay switches 15 and 16 are returned to normal. If a negative error is received from signal comparator 10 the delay switches 15 and 16 will be activated. This condition will remain until the error from signal comparator 13 terminates. It is pointed out that in the case of a negative error from signal comparator 10 an error from signal comparator 13 is already in progress. Those skilled in the art will readily see that in the case of televised moving or unmoving objects, the edges will always be in registration. Thus color fringing is eliminated.

As described in FIG. 1, the high frequencies that form the detail of the image are derived through the 2 magahertz high-pass filter 17 and are mixed with the luminous information from the matrix in the color encoder 8. Also, as in FIG. 1, the timing signal generator 18 activates the electronic channel switches 19, 20 and 21. These direct the different color signals into their respective inputs of the color encoder 8. The demodulators 19, 20, 21, 22, 23 serve purpose as in FIG. 1.

Description and Explanation of the Error Signal Modification and Reregistration Circuit The purpose of this embodiment is to combine the advantages of the fringe-chroma killer system of the Converter with the displacement delay system.

In normal television pickups, the prevalent motion of the cameras or subjects in front of the cameras is in the horizontal plane. Thus, it is important to give special emphasis on removing the color fringing on the vertical edges of televised subjects.

This embodiment uses the three one-field delay version of the Converter. It determines if the edge is on the right or left of the subject and if it is moving to the left or to the right. This is necessary because the original displacement error signal is one-third too wide; covering an area where all three colors are present and no fringing exists. This modification divides the error signal into thirds, decides which third is unnecessary, and eliminates it. The modified error signal now can be used to tie the color signals together to kill the chroma or to substitute a previous video signal on this edge to reregister the colors on the vertical edges. A vertical motion of the subject would cause a very wide error signal, exceeding the correction capabilities of this embodiment. In this case the error would not be modified and the color tie switch activated.

The error signal modification and reregistration circuit is divided into four parts:

1. The recognition circuit, using the live camera output and the polarity of the original error signal as reference, determines if the edge is on the left or right of the object and if the edge is moving to the left or right. 2. The error modification circuit, using timing devices and voltage-variable delays, eliminates either the first one-third or the last one-third of the error signal, depending on the instructions of the recognition circuit. 3. The live camera registration circuit uses the modified error to switch in the output of the third one-field delay until the edge is registered with the second one-field delay. 4. The first one-field delay registration circuit uses a timing device and voltage-variable delays to advance or delay the edge to register with the second one-field delay.

Figure 4:
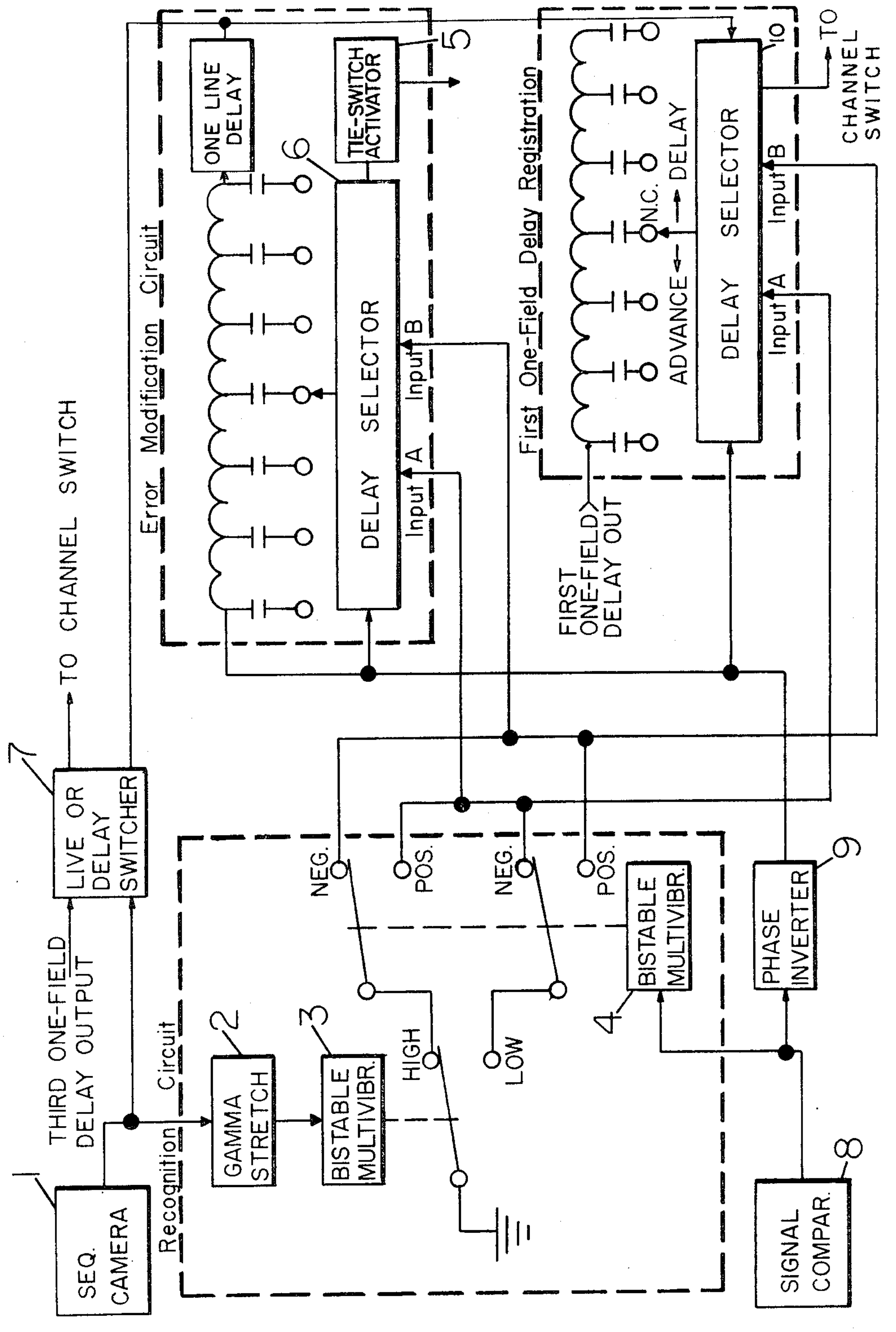
FIG. 4 schematically illustrates the error signal modification circuit with horizontal reregistration.
Figures 5A, 5B:
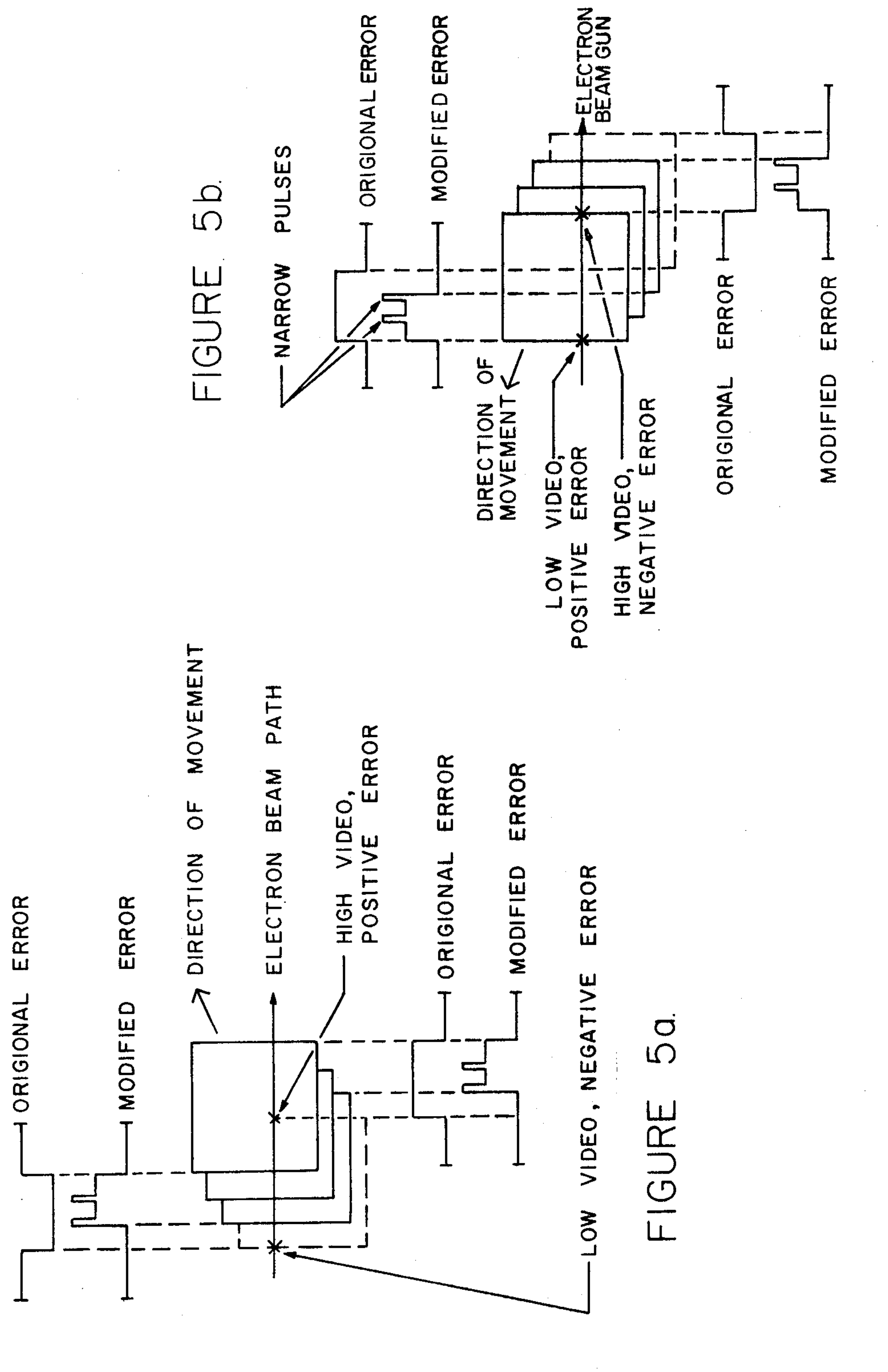
FIG. 5*a* & 5*b* illustrates a moving televised object and the resultant modified error signal.

Referring to the illustrations, FIG. 4 shows the embodiment in its entirety and is shown in conjunction with FIG. 1. This modification operates between the one-field delays and the channel switches. FIGS. 5*a* and 5*b* show a moving object with high video level, the displacement of the output of the field delays, and the original and modified displacement error signals.

The following is an explanation of the recognition circuit. The output of the sequential camera 1 is fed through a gamma stretcher 2 into a bistable multivibrator 3. The multivibrator will be in the 'low' position if the camera electron beam is scanning a dark area and approaching the left edge of the high level moving object. The 'high' position will be the camera electron beam scanning over the high-level object and approaching the right edge.

The original displacement error from the signal comparator 8 is fed into dual bistable multivibrators 4. The positions of these are determined by the polarity of the original displacement error. A positive error indicates high level video from the live camera and low video from the third one-field delay. A negative error indicates high level video from the third one-field delay and low video from the live camera.

Thus the recognition circuit recognizes four conditions: the right edge moving to the right (high video and positive error) and the left edge moving to the right (low video and negative error) will indicate that the first one-third of the error be removed. (FIG. 5*a*) The right edge moving to the left (high video and negative error) and the left edge moving to the left (low video and positive error) will indicate that the last one-third of the error be removed. (FIG. 5*b*)

The displacement error modification circuit with the use of a timing device and voltage-variable delays removes either the first one-third or the last one-third of the error signal. The original displacement error signal is placed through a selective phase inverter 9 to supply an always-positive error. It then enters the voltage-variable delays. The leading edge triggers the timing device in the delay selector 6 to measure the time duration of the error. The timer increases the proportionate voltage as the error progresses through the variable delays. The trailing edge of the error signal triggers the modification circuit to do several things. If 'Input B' has continuity, the timer voltage chooses the delay tap that contains the leading edge of the error and shunts it to ground for one-third of the error time duration. At this same instant, the timer voltage, through voltage dividers, allows a narrow pulse to be inserted onto the error signal at the delay tap representing two-thirds of the error duration, and a narrow pulse at the one-third duration point. (FIG. 5*b*) These will be used by the first one-field delay registration circuit. If 'Input A' has continuity through the recognition circuit, the tap that represents the last one-third error duration will add its narrow pulse, then shunt the last one-third of the error to ground. A narrow pulse will also be added at the two-thirds point on the error signal.

The resultant wave shape emerging from the one-line delay 11 to correct the fringing will be a square wave equivalent to two-thirds the original error length and two pulses bracketing the portion of the signal that was the center third of the original error signal. (FIGS. 5*a* & 5*b*) This modified error signal is fed through the one-line delay 11 to the camera registration circuit and the first one-field registration circuit.

The camera registration circuit has the live camera 1 input and the third one-field delay-input. Upon receipt of the modified error signal into the live or delay switcher 7, the field delay output is substituted for the live camera output for the duration of the signal. Affected edge will then be in registration with the edge of the second one-field delay.

Without the first one-field delay registration circuit, the Converter would produce one mis-registered edge showing as color fringing. This circuit will move the edge emerging from the first one-field delay, either advancing or delaying it, to match the edge emerging from the second one-field delay.

The output of the first one-field delay is fed into the first of the voltage-variable delays. The normal path would be through a set number of delays and through the center tap that is the no-error condition. The delays to the left of the normally closed tap represent part of the one-field delay. The leading edge of the original error signal would start the timing device in the delay selector 10. This timer measures the duration and builds a proportionate voltage until arrival of the first narrow pulse on the modified error signal. If 'Input A' is activated, the delay tap chosen by the timer moving in the 'advance' direction, will advance the video signal from the first one-field delay, bypassing the video signal remaining in the bypassed delays. This condition remains until the second narrow pulse arrives. Then the selector returns to the normal no-error normally closed position, repeating the video it had just fed for the error duration. If the 'Input B' had been activated, the delay tap chosen would be to the right in the 'delay' direction, (FIG. 4) repeating the previous video signal until the second narrow pulse arrived. Then it would return to normal. The delay taps in this circuit would sample the video from the delays in a bridging network rather than use all. As was explained, the same portion of the video signal would be used a second time.

The use of all circuits in this embodiment will reregister the vertical edges within the limits of the variable delays. The storage capacity of the delays in the error modification circuit need not exceed 5 or 6 microseconds. If the original displacement error exceeds these limits, it would indicate a vertical or a very fast horizontal movement of the televised object. In this case the modifier circuit would be bypassed and the tie-switch activator 5 would be used. Since the bandpass from the field delays would be limited to one megahertz or under, the storage between the taps need not be less than one-third to one-half microsecond.

Since the first one-field delay registration circuit delays operate for one-third of the error duration, the length of these need be only one-third of that of the error modification circuit.

Magnetic Disc Delay Lines

Figure 3:
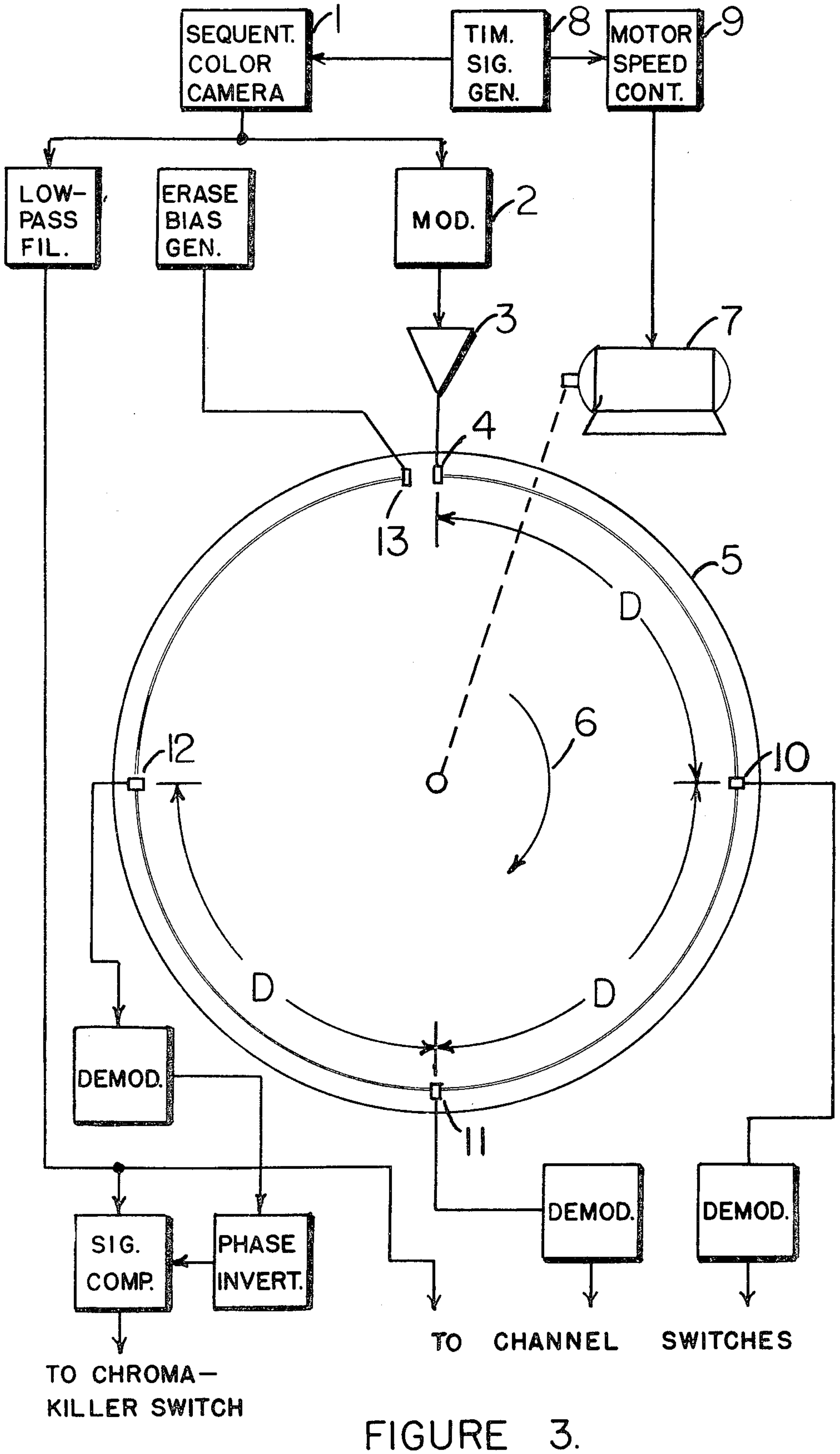
FIG. 3 represents the magnetic recording device as a cascade of one-field delay lines.

FIG. 3 illustrates the use of a magnetic disc recorder as a cascade of delays. The sequential color camera 1 directs the signal through the FM modulator 2 and amplifier 3 to the record head 4. The video is recorded on the magnetic disc 5 which is being rotated in the direction indicated by the arrow 6. The disc 5 is rotated by a motor 7, the speed of which is controlled by the timing signal generator 8 through the motor speed control 9. The spacing between each of the playback heads 10, 11, and 12 in FIG. 3 are one field (D) and indicate the disc speed as 900 RPM. Playback head 10 output corresponds to the output of one-field delay 3, playback head 11 output to delay 4 output and playback head 12 output to delay 5 output in FIG. 1 and FIG. 2. More playback heads would be added to correspond with delays 6 and 7 in FIG. 2. In this case the head arrangement and disc speed would be changed accordingly. The rest of the components in FIG. 3 correspond with their counterparts in FIG. 1. An erase head 13 is added to erase the single video track.

While the foregoing descriptions include what are at present considered to be the preferred embodiments of this invention, it will be obvious to those skilled in the art that various modifications may be made therein without departing from the invention, and it is aimed to cover all such changes and modifications as fall within the true spirit and scope of the invention.

What I claim is:

1. In a color television signal converting apparatus wherein a plurality of television signals are supplied in sequence with each of said signals representing a different color component of an image, means for detecting chroma fringing created by relative movement of televised subjects, which comprise means for delaying one of said signals of a given color and means for comparing said signal with a closely preceding signal of the same color, whereby a chroma fringing signal due to relative movement of the televised subject matter is substantially isolated.

2. The apparatus of claim 1 wherein means is provided for substantially removing the different color signals corresponding to said isolated chroma fringing signals.

3. The apparatus of claim 2 wherein said means for removing the different color signals comprises means for altering the monochrome level corresponding to said isolated chroma fringing signals.

4. The apparatus of claim 2 wherein means is provided for shorting together the different color signals corresponding to said isolated chroma fringing signals.

5. The apparatus of claim 2 wherein means is provided for substantially replacing the different color signals corresponding to the isolated fringing signals with said closely preceding signals.

6. The apparatus of claim 1 wherein means is provided for detecting the direction of relative movement between the television camera and the televised subjects.

7. The apparatus of claim 6 wherein means is provided for selectively reregistering the edge of said televised subjects corresponding to said detected direction of movement.

* * * * *